US009541142B2

(12) United States Patent
Spina et al.

(10) Patent No.: US 9,541,142 B2
(45) Date of Patent: Jan. 10, 2017

(54) MAGNETORHEOLOGICAL FLIGHT CONTROL CLUTCH SYSTEM

(71) Applicant: Bell Helicopter Textron Inc., Fort Worth, TX (US)

(72) Inventors: Pasquale Spina, Laval (CA); Carlos A Fenny, Arlington, TX (US); Jean-Sebastian Plante, Sherbrooke (CA); Patrick Chouinard, Sherbrooke (CA); Jean-Philippe Lucking Bigué, Sherbrooke (CA); Yves St-Amant, Lévis (CA)

(73) Assignee: Bell Helicopter Textron Inc., Fort Worth, TX (US)

(*) Notice: Subject to any disclaimer, the term of this patent is extended or adjusted under 35 U.S.C. 154(b) by 405 days.

(21) Appl. No.: 14/482,603

(22) Filed: Sep. 10, 2014

(65) Prior Publication Data

US 2015/0267762 A1    Sep. 24, 2015

Related U.S. Application Data

(60) Provisional application No. 61/934,141, filed on Jan. 31, 2014.

(51) Int. Cl.
*F16D 37/00* (2006.01)
*B64C 27/56* (2006.01)
(Continued)

(52) U.S. Cl.
CPC ............. *F16D 37/008* (2013.01); *B64C 13/28* (2013.01); *B64C 27/08* (2013.01); *B64C 27/12* (2013.01);
(Continued)

(58) Field of Classification Search
CPC .......... B64C 13/28; B64C 27/08; B64C 27/12; B64C 27/56; B64C 27/605; B64C 27/64; B64C 27/68; B64C 27/78; B64C 35/02; B64C 35/04; F16D 2037/001; F16D 37/008; F16D 37/02; F16D 2025/2059; F16D 25/20; Y02T 50/44; Y02T 74/18704
(Continued)

(56) References Cited

U.S. PATENT DOCUMENTS 2,383,779 A    8/1945    Dobmeier
2,857,776 A    10/1958   Steere
(Continued)

FOREIGN PATENT DOCUMENTS

JP    2014173697    9/2014

OTHER PUBLICATIONS

Office Action in related U.S. Appl. No. 14/482,646, dated Jan. 20, 2016, 19 pages.
(Continued)

*Primary Examiner* — Jacob S Scott

(57) ABSTRACT

In some embodiments, a redundant control system includes first and second control systems, having first and second clutches, and a shared clutch system. The shared clutch system may include a shared shaft configured to receive mechanical energy from a shared power source, a first shared clutch corresponding to the first clutch and configured to receive mechanical energy from the shared shaft, and a second shared clutch corresponding to the second clutch and configured to receive mechanical energy from the shared shaft. A first linkage provides mechanical communication between an output of the first clutch, an output of the first shared clutch, and a first output device in mechanical communication with the rotor system. A second linkage provides mechanical communication between an output of the second clutch, an output of the second shared clutch, and
(Continued)

a second output device in mechanical communication with the rotor system.

20 Claims, 16 Drawing Sheets

(51) Int. Cl.

| | | |
|---|---|---|
| *B64C 27/64* | (2006.01) | |
| *B64C 27/68* | (2006.01) | |
| *B64C 27/12* | (2006.01) | |
| *B64C 27/78* | (2006.01) | |
| *B64D 35/02* | (2006.01) | |
| *F16D 37/02* | (2006.01) | |
| *B64C 13/28* | (2006.01) | |
| *B64C 27/605* | (2006.01) | |
| *B64C 27/08* | (2006.01) | |
| *B64D 35/04* | (2006.01) | |
| *F16H 25/20* | (2006.01) | |

(52) U.S. Cl.
CPC ............ *B64C 27/56* (2013.01); *B64C 27/605* (2013.01); *B64C 27/64* (2013.01); *B64C 27/68* (2013.01); *B64C 27/78* (2013.01); *B64D 35/02* (2013.01); *B64D 35/04* (2013.01); *F16D 37/02* (2013.01); *F16D 2037/001* (2013.01); *F16H 25/20* (2013.01); *F16H 2025/2059* (2013.01); *Y02T 50/44* (2013.01); *Y10T 74/18704* (2015.01)

(58) Field of Classification Search
USPC ........................................................ 192/48.1
See application file for complete search history.

(56) References Cited

U.S. PATENT DOCUMENTS

| | | | |
|---|---|---|---|
| 4,730,503 A | | 3/1988 | Rosenthal |
| 5,647,245 A | | 7/1997 | Takei |
| 6,254,037 B1 | * | 7/2001 | Fenny ................ B64C 13/46 244/221 |
| 6,373,465 B2 | | 4/2002 | Jolly et al. |
| 2003/0134707 A1 | | 7/2003 | Goldie |
| 2003/0155201 A1 | | 8/2003 | Bowen |
| 2005/0201863 A1 | | 9/2005 | Welsh |
| 2005/0269887 A1 | | 12/2005 | Blanding |
| 2008/0289440 A1 | | 11/2008 | Denk |
| 2010/0059944 A1 | | 3/2010 | Oteman |
| 2010/0269604 A1 | | 10/2010 | Fujiwara |
| 2010/0284637 A1 | | 11/2010 | Sentmanat |
| 2011/0045932 A1 | | 2/2011 | Fauteux |
| 2013/0313358 A1 | | 11/2013 | Hale |
| 2014/0137679 A1 | | 5/2014 | Pittini |
| 2015/0083868 A1 | * | 3/2015 | Covington, Jr. ........ B64C 13/50 244/227 |
| 2015/0217865 A1 | * | 8/2015 | Spina ................ B64C 27/08 244/227 |

OTHER PUBLICATIONS

Notice of Allowance in related U.S. Appl. No. 14/482,646 dated May 27, 2016, 12 pages.

* cited by examiner

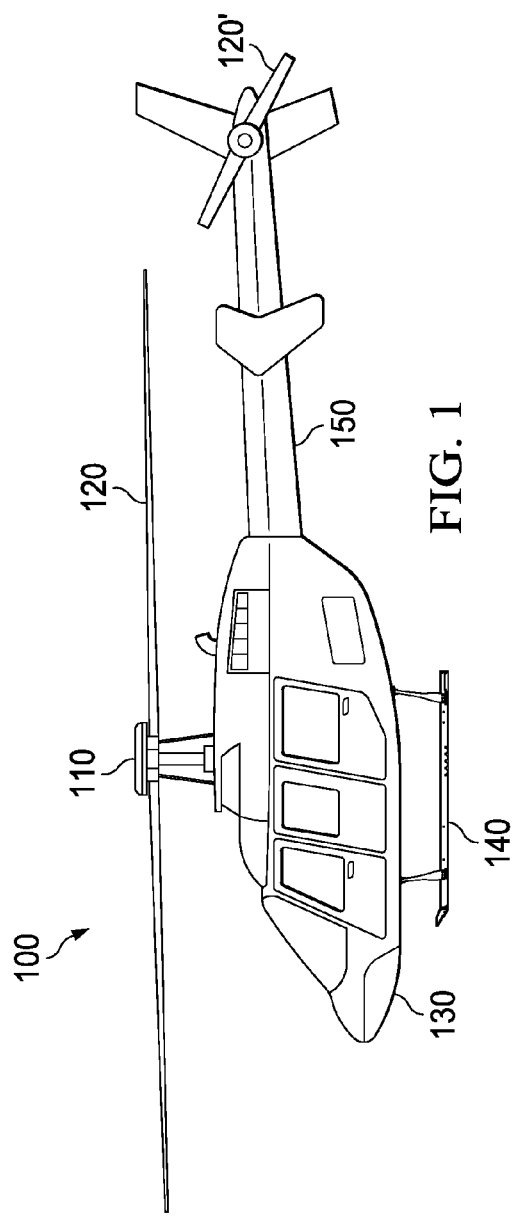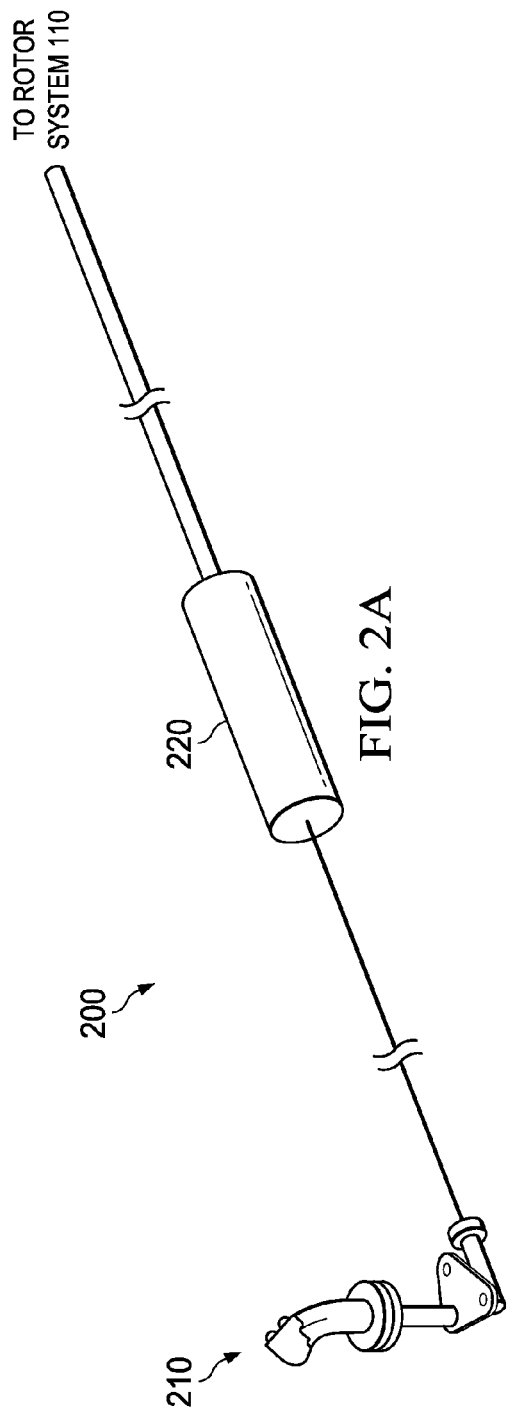

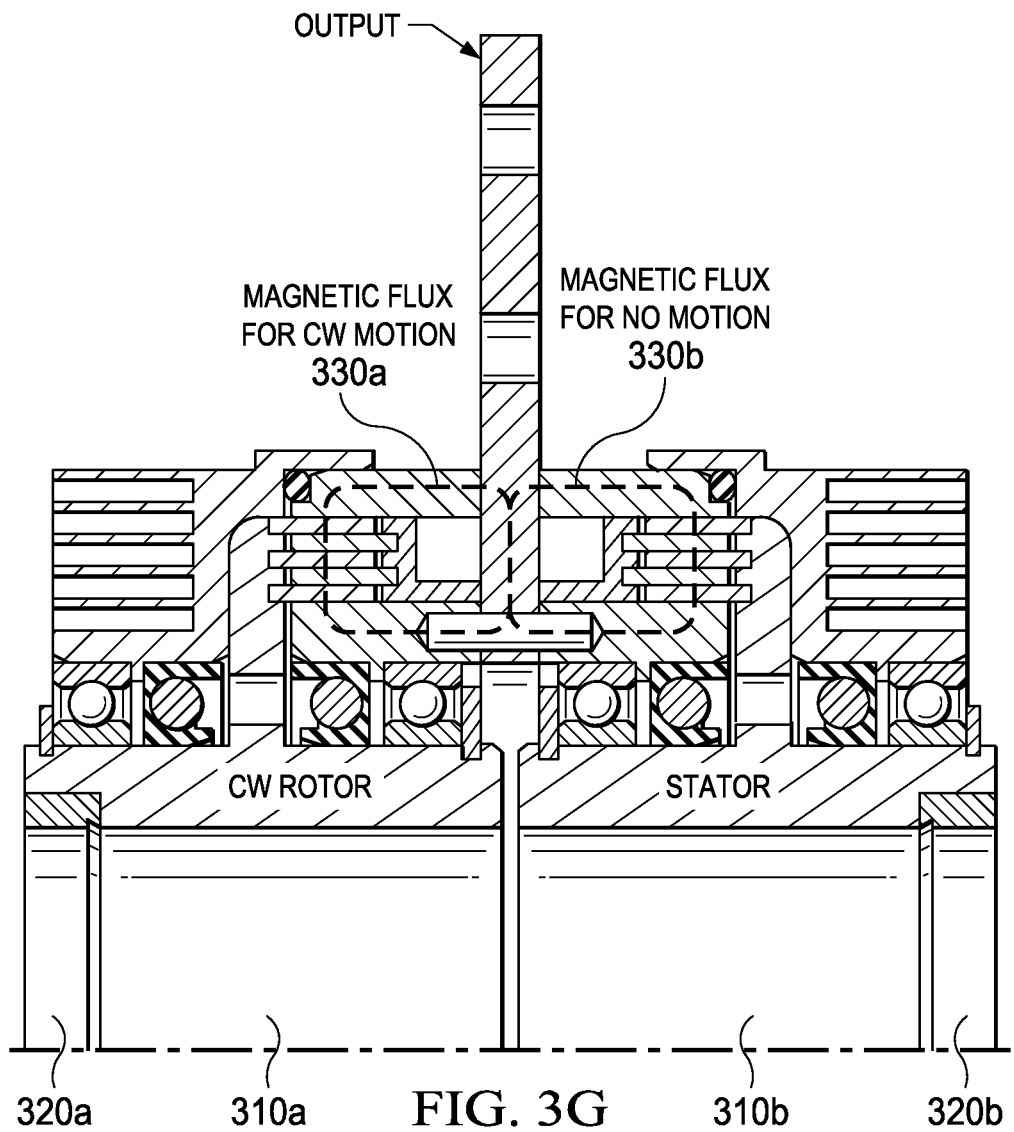

MAGNETORHEOLOGICAL FLIGHT CONTROL CLUTCH SYSTEM

RELATED APPLICATIONS

Pursuant to 35 U.S.C. §119 (e), this application claims priority to U.S. Provisional Patent Application Ser. No. 61/934,141, MAGNETORHEOLOGICAL ROTORCRAFT DEVICES, filed Jan. 31, 2014. U.S. Provisional Patent Application Ser. No. 61/934,141 is hereby incorporated by reference.

TECHNICAL FIELD

This invention relates generally to flight control systems, and more particularly, to magnetorheological flight control system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to reduce costly maintenance operations and environmental impact. A technical advantage of one embodiment may include the capability to optimize the weight of a flight control system to more closely match operational loads. A technical advantage of one embodiment may include the capability to satisfy reliability standards by providing redundant components and by using magnetorheological devices that have relatively few components, relatively few moving parts, and transfer torque through fluid rather than solid contact surfaces. A technical advantage of one embodiment may include the capability to provide higher dynamic response than hydraulic and electromechanical actuators.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 1 shows a rotorcraft according to one example embodiment;

FIG. 2A shows an example flight control system according to one example embodiment that may be incorporated into an aircraft such as the rotorcraft of FIG. 1;

FIGS. 3F and 3G show two example embodiments of the MR fluid clutch actuator of FIGS. 3A-3C with two independent MR devices;

DETAILED DESCRIPTION OF THE DRAWINGS

Figure 2B:
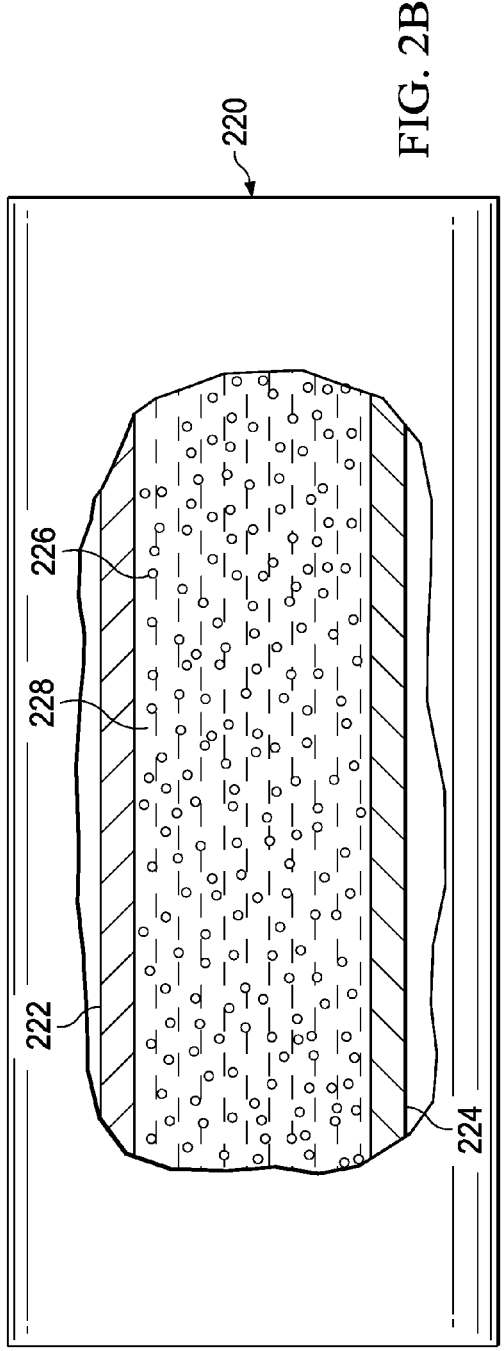
FIG. 2B shows a magnetorheological (MR) fluid clutch actuator according to one example embodiment that may be incorporated into a flight control system such as the example flight control system of FIG. 2A.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. In some embodiments, the control system may include a swashplate; moving the swashplate may change the pitch of one or more blades 120 and cause the aircraft to change direction.

Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

As stated above, a control system may selectively control the pitch of each blade 120 in order to selectively control direction, thrust, and lift of rotorcraft 100. In some embodiments, a control system may receive inputs (e.g., from a pilot, flight computer, and/or other flight control equipment) and change the pitch of each blade 120 based on these inputs by, for example, changing the swashplate position. Example embodiments of a control system for selectively controlling the pitch of blades 120 may include equipment from mechanical, fly-by-wire, and/or other flight control systems.

FIG. 2A shows an example control system 200 according to one example embodiment. In the example of FIG. 2A, control system 200 represents a hybrid fly-by-wire/mechanical control system that features an input device 210, an actuator system 220, a transmission wire coupled between input device 210 and actuator system 220, and a variety of linkages mechanically communicating actuator system 220 with components of rotor system 110 (e.g., a swashplate).

Actuator system 220 may represent a device configured to provide a mechanical output position based on a received pilot input position. One example of an actuator may include a hydraulic actuator. A hydraulic actuator utilizes hydraulic fluid to provide the force necessary to operate against external flight loads. A hydraulic actuator may also provide mechanically implemented and reliable position regulation of the output relative to the pilot command. Hydraulic actuators, however, may require complex hydraulic systems to provide the hydraulic power source. Accordingly, teachings of certain embodiments recognize the capability to provide actuation without relying on a hydraulic power source.

For example, teachings of certain embodiments recognize the capability to utilize magnetorheological (MR) fluid in an actuator such as one found in actuator system 220. MR fluid is a type of smart fluid that may be disposed in a carrier fluid, usually a type of oil. When subjected to a magnetic field, the fluid may increase its yield stress, potentially to the point of becoming a viscoelastic solid. The yield stress of the fluid when in its active ("on") state may be controlled by varying the magnetic field intensity. Accordingly, the fluid's ability to transmit force can be controlled by modulating current in an electromagnet.

Figure 2C:
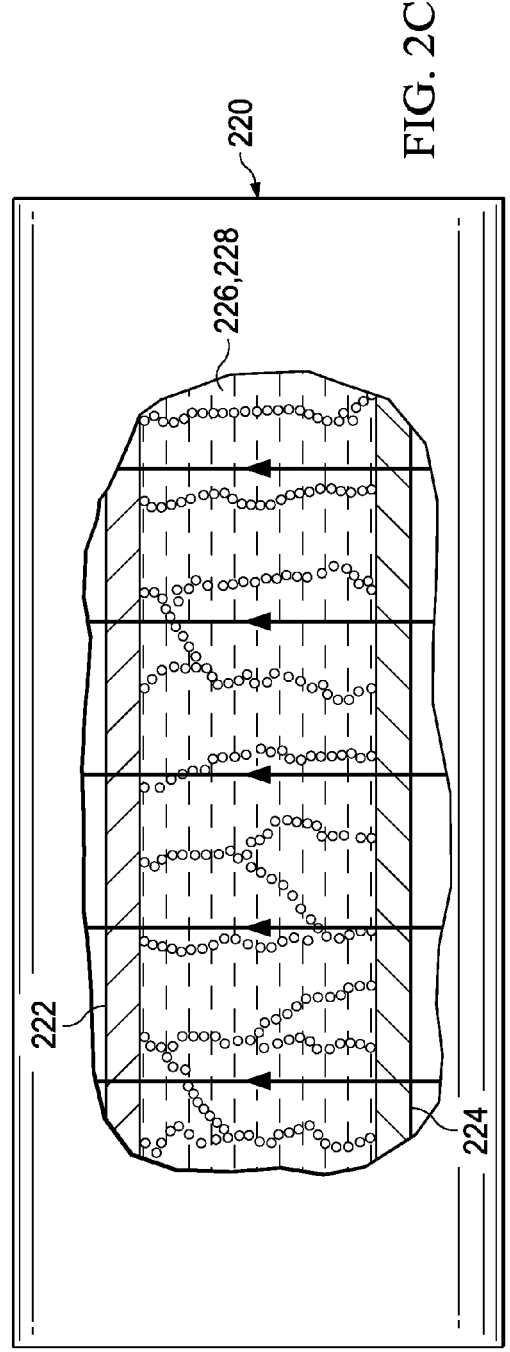
FIG. 2C shows the MR fluid clutch actuator of FIG. 2B when subject to a larger magnetic flux.

As will be explained in greater detail below, a MR fluid clutch actuator may provide an output in response to an input received from a pilot (or other input source). For example, FIGS. 2B and 2C show example conceptual views of a MR fluid clutch actuator system 220 according to one example embodiment. The example MR fluid clutch actuator system 220 features bodies 222 and 224 separated by an MR fluid 226 disposed in a carrier fluid 228. In the example of FIGS. 2B and 2C, body 222 may be in mechanical communication with input device 210, and body 224 may be in mechanical communication with devices associated with rotor system 110.

FIG. 2B shows MR fluid clutch actuator system 220 when the MR fluid 226 is subject to little or no magnetic flux, whereas FIG. 2C shows MR fluid clutch actuator system 220 when the MR fluid 226 is subject to a larger magnetic flux. Accordingly, the example of FIG. 2B may allow increased movement between bodies 222 and 224, whereas the example of FIG. 2C may restrict movement between bodies 222 and 224.

Accordingly, MR fluid clutch actuator system 220 may vary the amount of force provided in response to a received input by changing the amount of magnetic flux received by MR fluid 226. In particular, MR fluid clutch actuator system 220 may provide an output force based on the input force by changing the amount of magnetic flux based on the input force. In addition, MR fluid clutch actuator system 220 may be less prone to component failures than some other actuators because MR fluid 226 and carrier fluid 228 may prevent at least some friction between bodies 222 and 224. For example MR fluid clutch actuator system 220 may prevent metal-to-metal contact between sliding bodies; such metal-to-metal contact could cause heat spots and concentrated wear that can lead to mechanical seizure (e.g., binding) if such contact is not prevented.

Figure 3A:
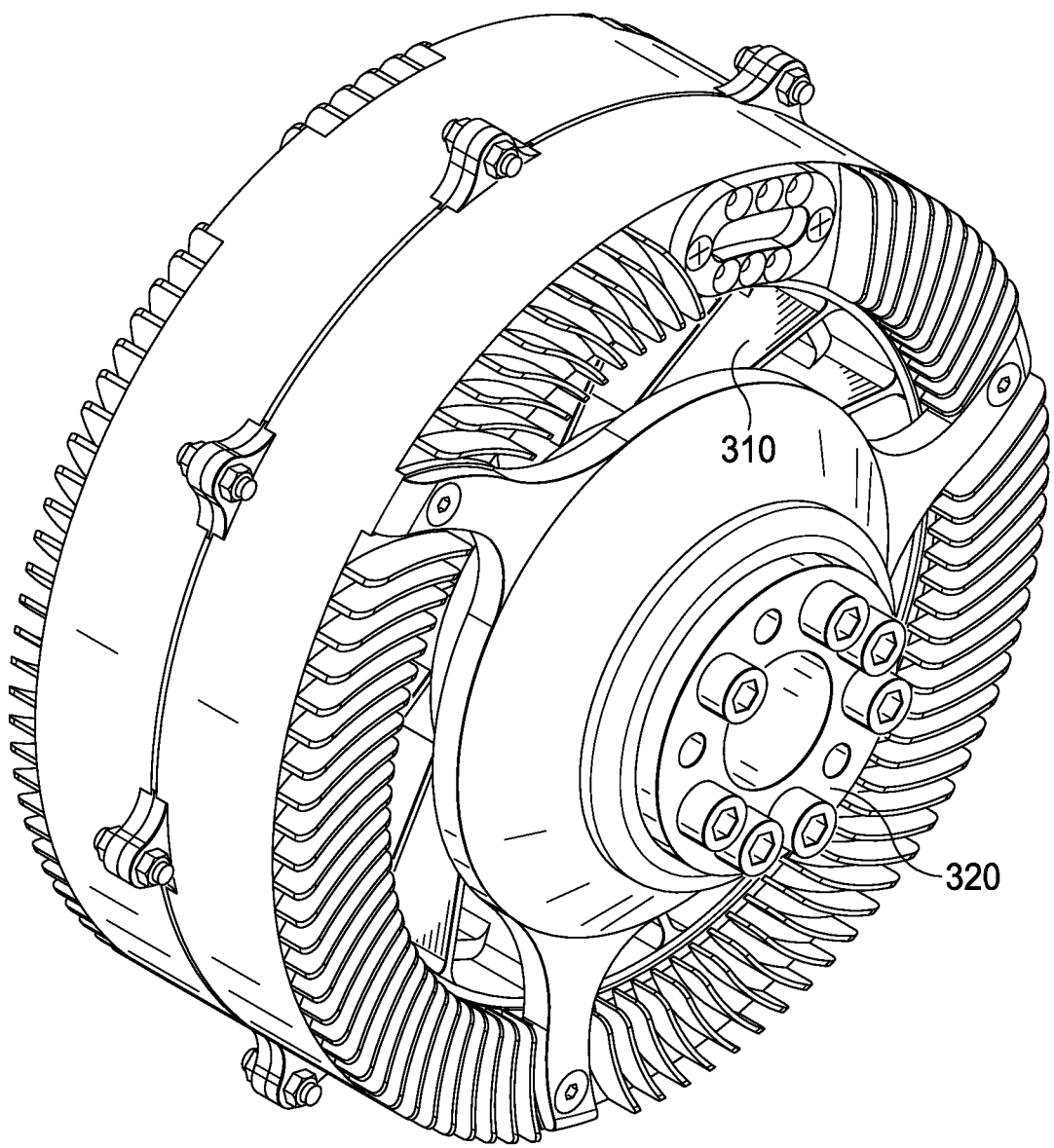
FIG. 3A shows a perspective view of a MR fluid clutch actuator that may represent one example of the MR fluid clutch actuator of FIGS. 2B and 2C.
Figure 3B:
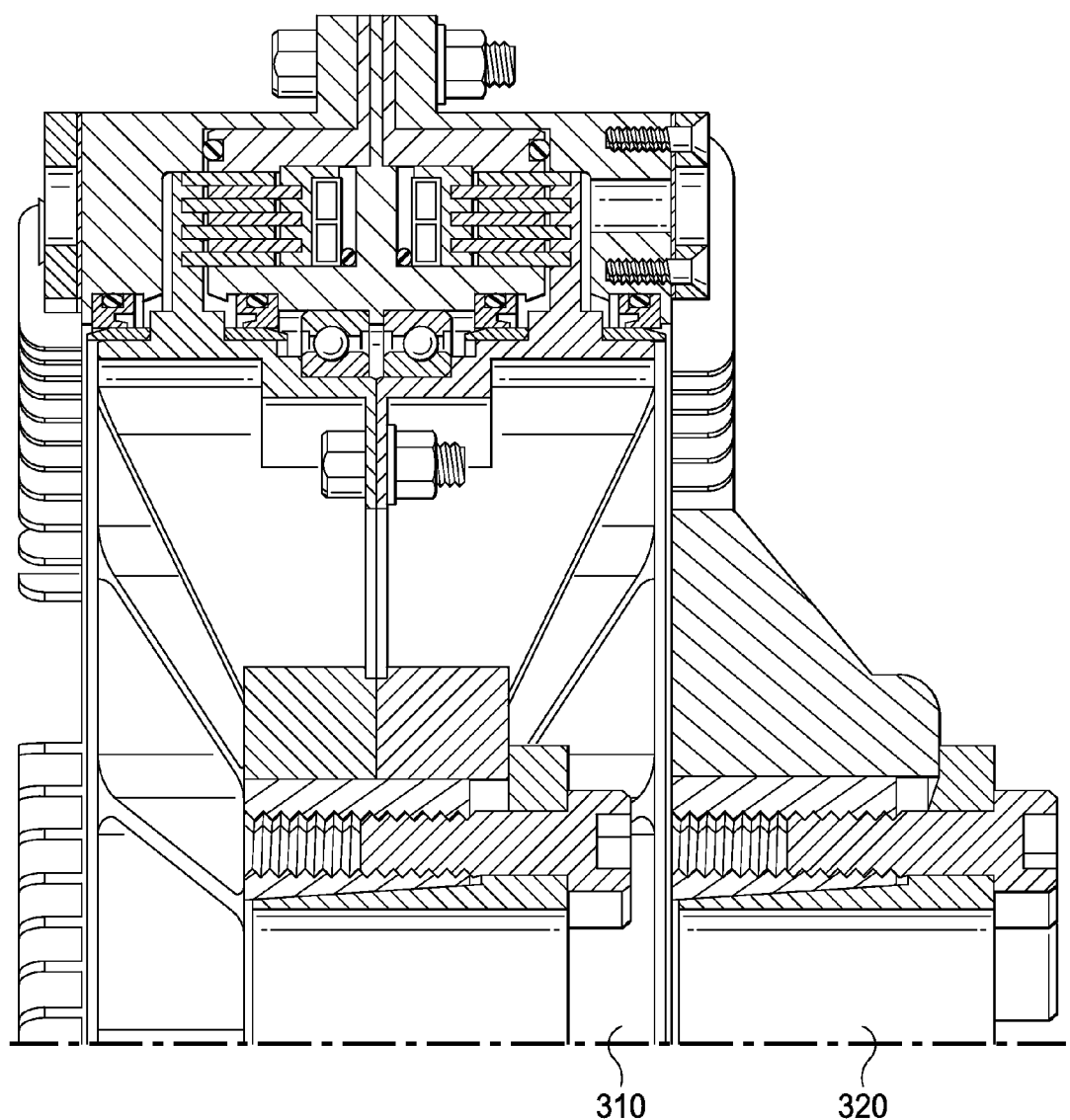
FIG. 3B shows a cross-section view of the MR fluid clutch actuator of FIG. 3A.
Figure 3C:
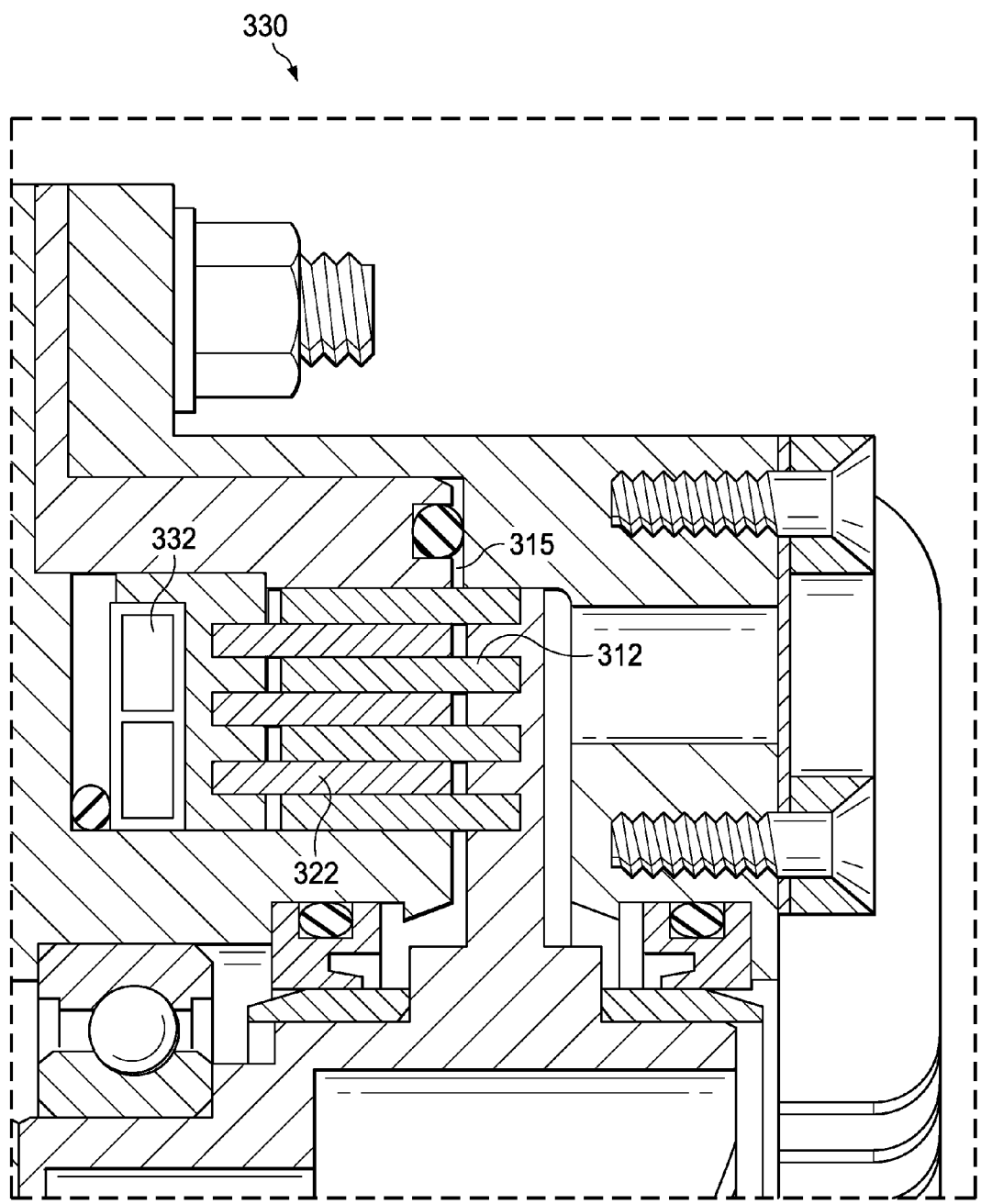
FIG. 3C shows a detailed view of the cross-section view of FIG. 3B.

Teachings of certain embodiments recognize that an MR fluid clutch actuator, such as MR fluid clutch actuator system 220, may provide an output force by applying a working force to the output body. For example, FIGS. 3A, 3B, and 3C show an MR fluid clutch actuator 300 according to one example embodiment. FIG. 3A shows a perspective view of MR fluid clutch actuator 300, FIG. 3B shows a cross-section view of the MR fluid clutch actuator 300 of FIG. 3A, and FIG. 3C shows a detailed view of the cross-section view of FIG. 3B.

In the example of FIGS. 3A-3C, MR fluid clutch actuator 300 features a driving member 310, a driven member 320, and a magnetic field system 330. MR fluid 315 (as well as carrier fluid) may be disposed between driving member 310 and driven member 320. In the example of FIGS. 3A-3C, driving member 310 is represented by an input rotor that may receive rotational energy (torque) from a power device, such as a motor. Also in this example, driven member 320 is represented by an output casing. The output casing may be coupled to various mechanical components, such as components in mechanical communication with the swashplate of a flight control system.

In operation, according to one example embodiment, a power source (not shown) causes driving member 310 to rotate. MR fluid 315 transmits at least some rotational energy (torque) to driven member 320, thereby causing driven member 320 to rotate. Magnetic field system 330 subjects MR fluid 315 to a magnetic field that, if changed, may change the viscosity of MR fluid 315. Changing the viscosity of MR fluid 315, in turn, may change the amount of rotational energy transferred from driving member 310 to driven member 320. Accordingly, in this example, the amount of rotational energy transferred to driven member 320 may be regulated by controlling the amount of magnetic field generated by magnetic field system 330.

In the example of FIG. 3C, magnetic field system 330 features a coil 332 disposed adjacent to MR fluid 315. In this example, the MR fluid 315 is disposed between a rotor drum 312, which is coupled to driving member 310, and a stator drum 322. In operation, magnetic field system 330 may control the amount of rotational energy transferred from driving member 310 to driven member 320 by adjusting the magnetic field 334 generated by coil 332, which results in a change in viscosity of the MR fluid 315 situated between rotor drum 312 and stator drum 322. This magnetic field 334 may be adjusted, for example, by adjusting the amount of current that is fed to coil 332. An example of magnetic field 334 is shown in greater detail in FIG. 3D.

Figure 3D:
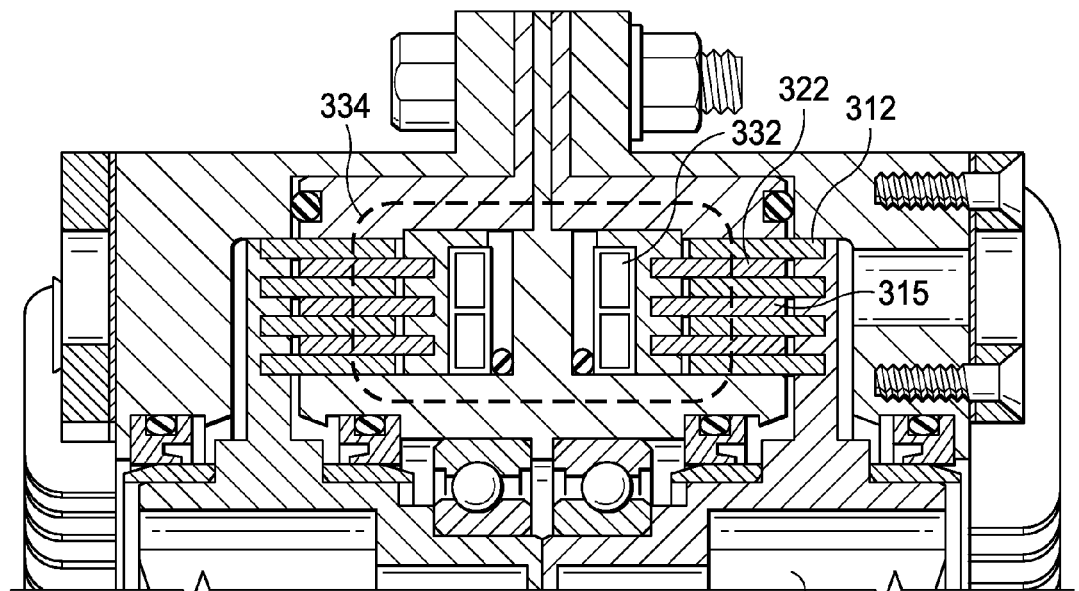
FIGS. 3D and 3E show example magnetic fields of the MR fluid clutch actuator of FIGS. 3A-3C.
Figure 3E:
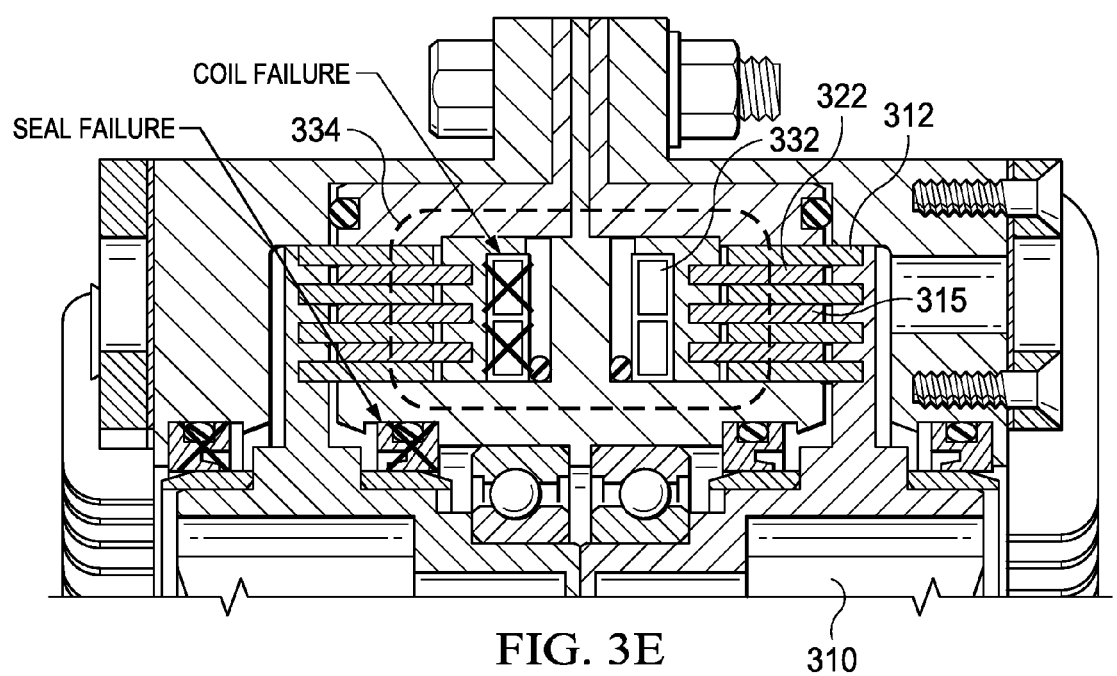

In the example of FIG. 3D, the magnetic circuit low cross section and material composition may minimize the generation of Eddy currents and allow for high dynamic response. The clutch may have a high reliability because of coil and fluid chamber redundancy. For example, in case of a coil failure or a seal failure as shown in FIG. 3E, the magnetic flux generated by the coils may be redirected through the central path of the magnetic circuit. This unique feature may allow the clutch to remain functional despite a single component failure.

Figure 3F:
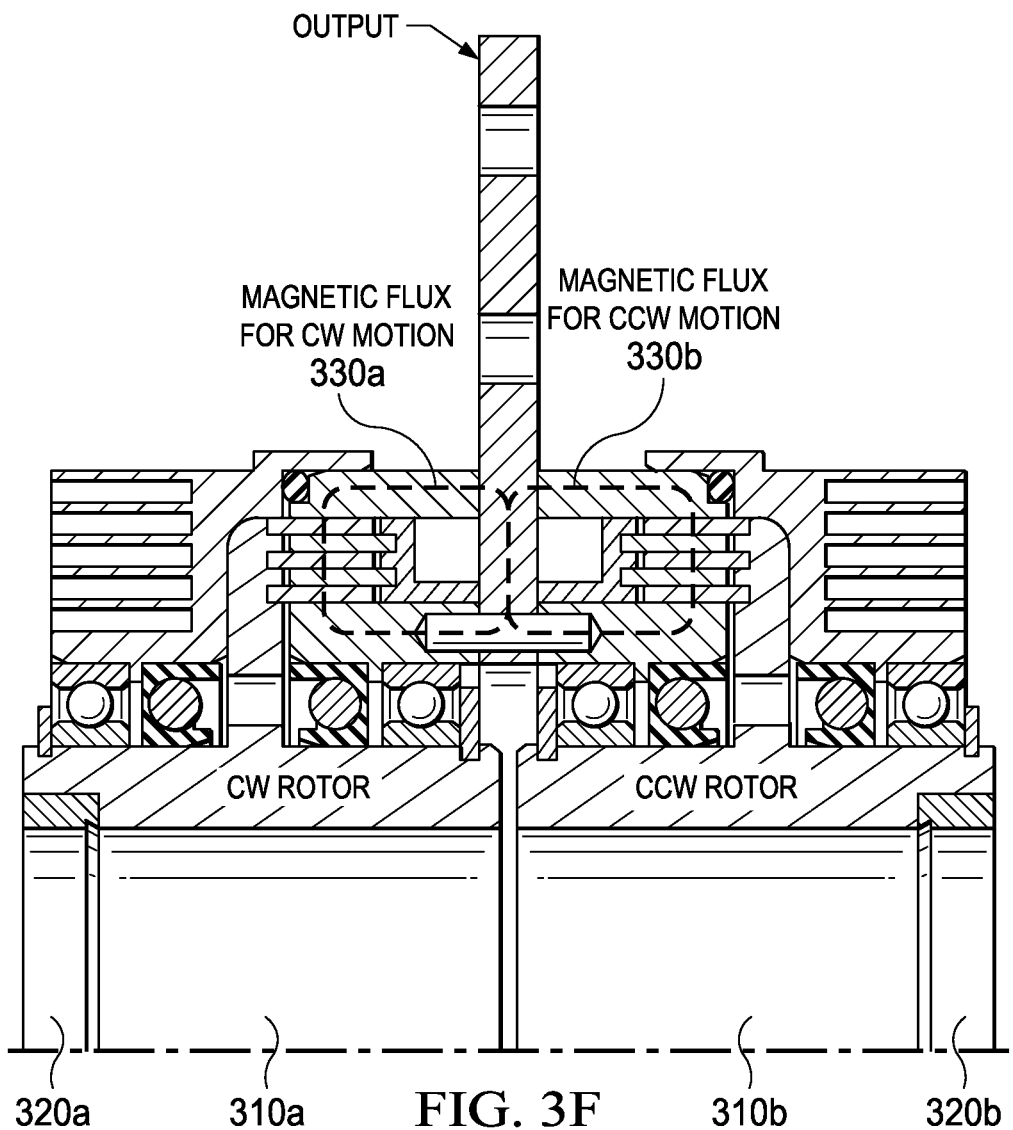

In some embodiments, a single MR fluid boost actuator 300 may be configured to operate as two independent MR devices by sharing magnetic field system 300 across the two devices. For example, FIGS. 3F and 3G show two example embodiments of MR fluid boost actuator 300 with two independent MR devices. In the example of FIG. 3F, magnetic field 330 features a magnetic field portion 330a that causes driven member 320a to rotate clockwise and a magnetic field portion 330b that causes driven member 320b to rotate counterclockwise. In the example of FIG. 3G, magnetic field 330 features a magnetic field portion 330a that causes driven member 320a to rotate clockwise and a magnetic field portion 330b that causes driven member 320b not to rotate.

Figure 4A:
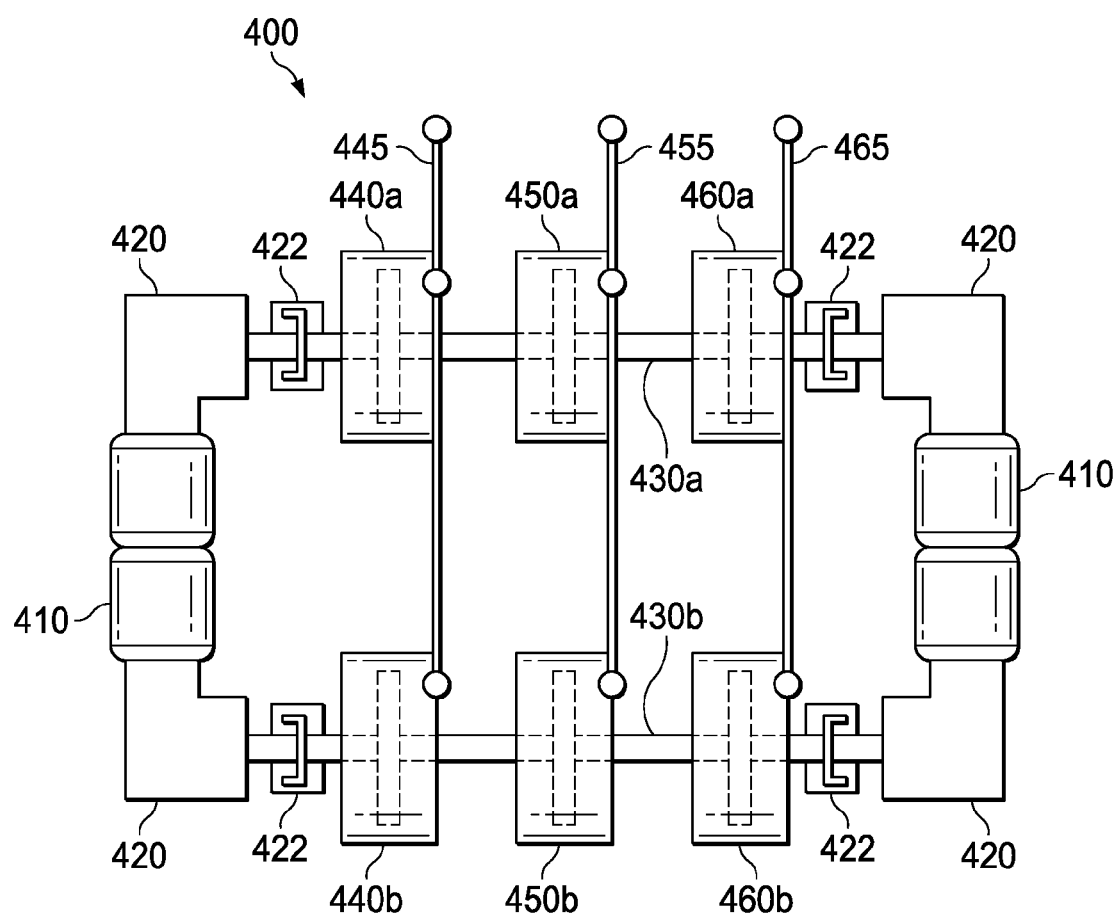
FIG. 4A shows a schematic top view of a controlled-slippage actuation (CSA) system that incorporates at least one MR device such as the MR fluid clutch actuator of FIGS. 3A-3C.
Figure 4B:
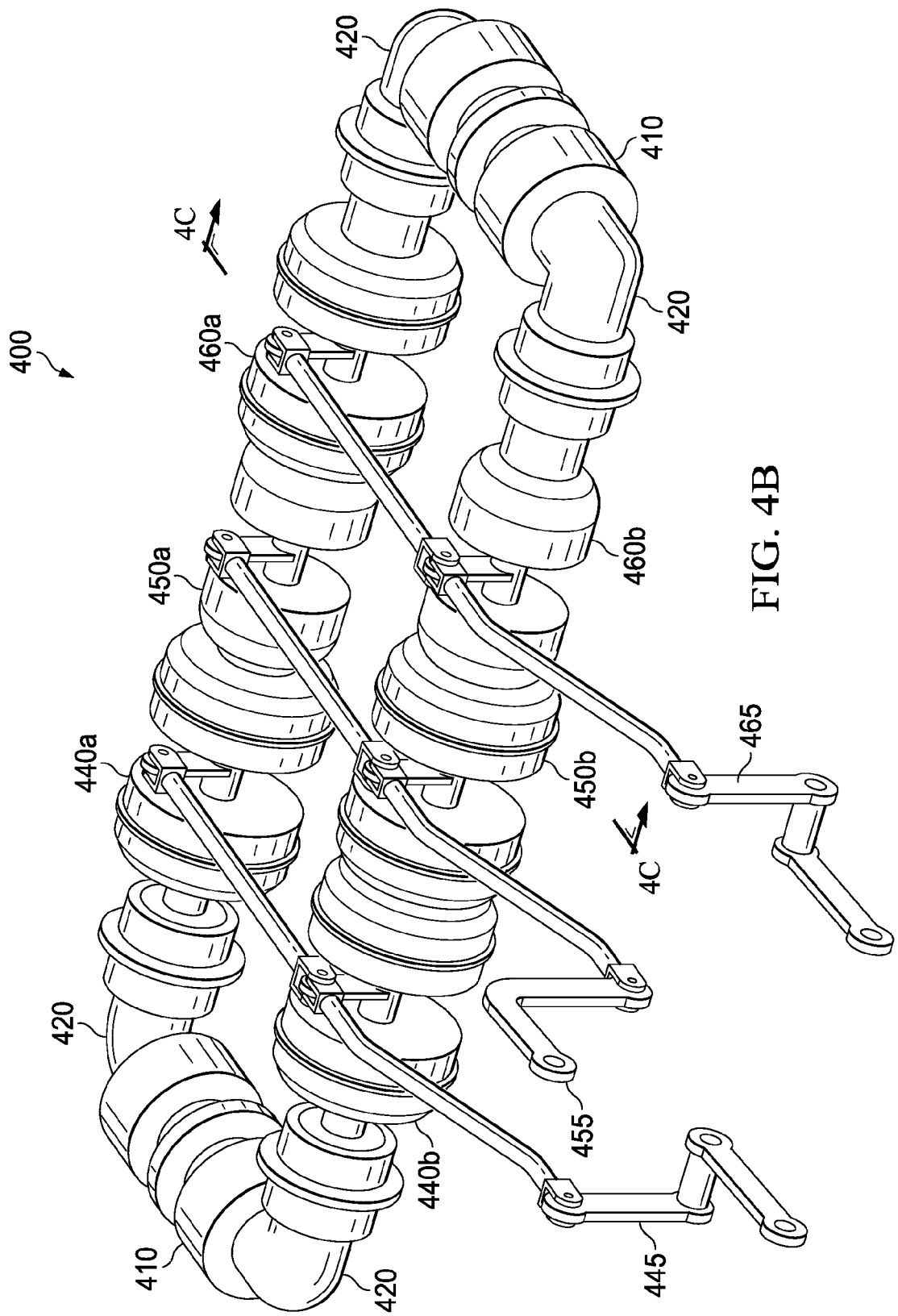
FIG. 4B shows a perspective view of a CSA system based on the CSA system of FIG. 4A.
Figure 4C:
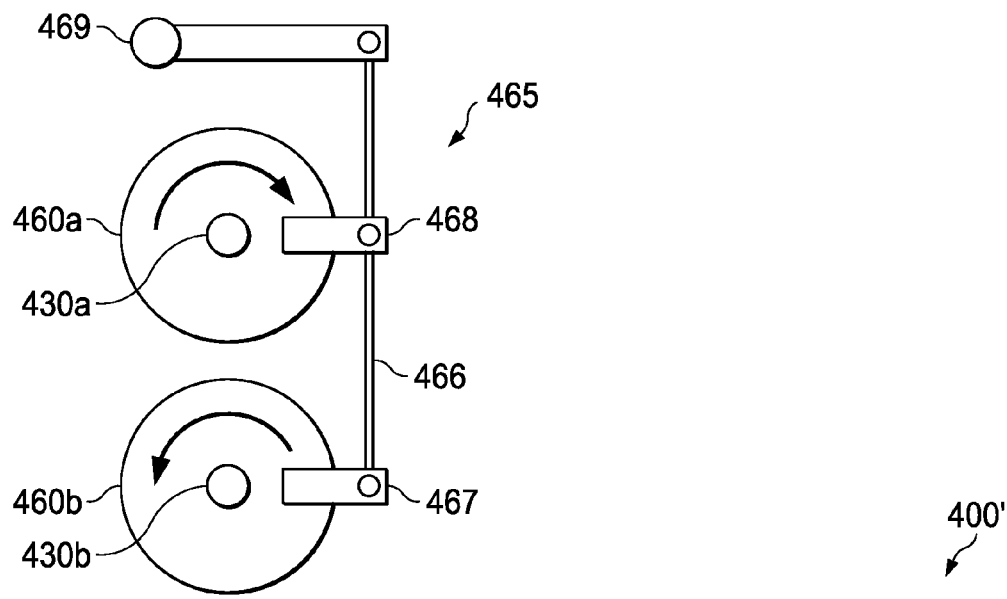
FIG. 4C shows a cross-section view of one output segment of the CSA system of FIG. 4A.

MR devices such as MR fluid clutch actuator 300 may be incorporated into a variety of aerospace systems, such as the flight control system of rotorcraft 100. For example, FIGS. 4A-4C show a controlled-slippage actuation (CSA) system 400 according to one example embodiment. FIG. 4A shows a schematic top view of CSA system 400, FIG. 4B shows a perspective view of CSA system 400, and FIG. 4C shows a cross-section view of one output segment of CSA system 400. Teachings of certain embodiments recognize that CSA system 400 may provide three flight control outputs (e.g., two cyclic outputs and one collective output) during operation of rotorcraft 100. Teachings of certain embodiments recognize, however, that variations of CSA system 400 may have more or fewer outputs.

In the example of FIGS. 4A-4C, CSA system 400 features motors 410, right-angle gearboxes 420, unidirectional clutches 422, a clockwise-rotating shaft (CW shaft) 430a, a counterclockwise-rotating shaft (CCW shaft) 430b, three pairs of MR fluid clutch actuators 440a and 440b, 450a and 450b, and 460a and 460b, and three output linkage assemblies 445, 455, and 465. MR fluid clutch actuators 440a, 440b, 450a, 450b, 460a, and 460b may represent examples of MR fluid clutch actuator 300.

In the example of FIGS. 4A-4C, motors 410 may rotate CW shaft 430a and CCW shaft 430b in opposite directions. In the example embodiment of FIGS. 4A-4C, motors 410 are high-speed electric motors. In this example embodiment, unidirectional clutches 422 are provided to disconnect jammed rotary units from CW shaft 430a and CCW shaft 430b. In the event of a jammed rotary unit, the unidirectional clutch 422 may be overruned by the adjacent rotary unit.

Figure 4D:
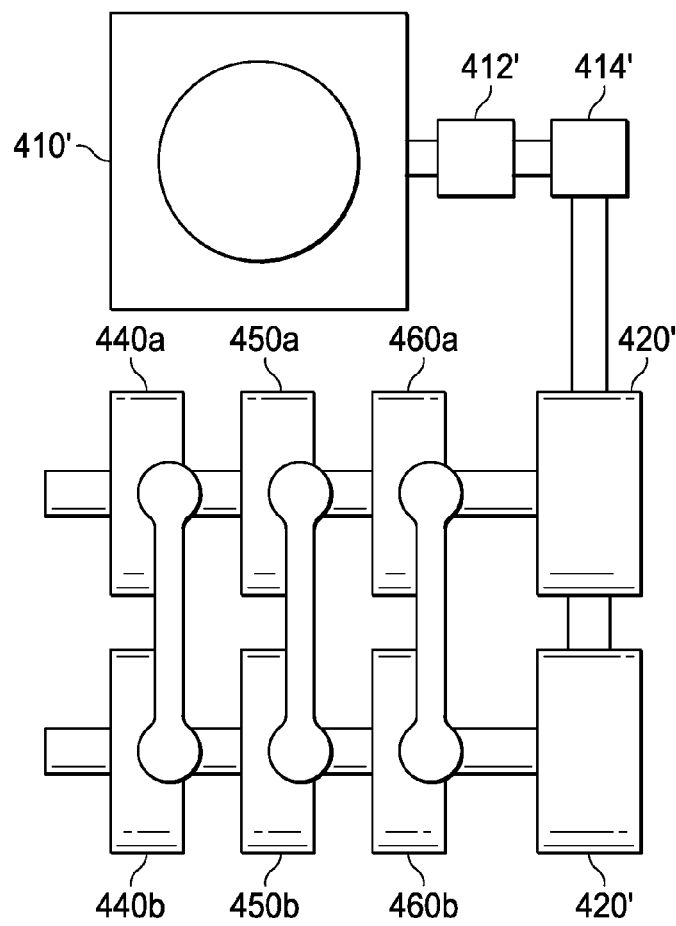
FIG. 4D shows an alternative embodiment of the CSA system of FIGS. 4A-4C.

Although the example of FIGS. 4A-4C include electric motors, teachings of certain embodiments recognize that other power sources may be included. For example, FIG. 4D shows a CSA system 400' according to one example embodiment. In the example of FIG. 4D, power is provided through the rotorcraft gearbox 410', through a torque limiter 412' and a ninety degree gearbox 414' to a pair of ninety degree gearbox and planetaries 420', which transmit the power to the CW clutch actuators 440a-460a and the CCW clutch actuators 440b-460b. Although only one gearbox is shown in the example of FIG. 4D, teachings of certain embodiments recognize that power may be transmitted from the rotorcraft gearbox to the MR clutch actuators via redundant gearboxes.

Returning to the example of FIGS. 4A-4C, each pair of MR fluid clutch actuators includes one MR fluid clutch actuator coupled to CW shaft 430a and CCW shaft 430b. Teachings of certain embodiments recognize that providing a pair of two MR fluid clutch actuators having counter-rotating inputs may allow the pair, in combination, to control the back and forth motion of the output linkage assembly.

In the example of FIGS. 4A-4C, each pair of MR fluid clutch actuators is coupled to a corresponding output linkage assembly. For example, as seen in FIG. 4C, output linkage assembly 465 is coupled to MR fluid clutch actuators 460a and 460b. In this example, output linkage assembly 465 includes a four-bar mechanism. A summing bar 466 receives mechanical inputs from two input bars 467 and 468 and moves output bar 469 in response to the received inputs.

In operation, according to one example embodiment, CW shaft 430a and CCW shaft 430b rotate in opposite directions. When the system is at equilibrium, the outputs of each pair of MR clutch actuators cancel each other out, and the output linkage assembly does not move. CSA system 400 may control the movement of each output linkage assembly, however, by controlling the shear stress of the MR fluid within each MR clutch actuator. For example, changing the shear stress (for example, by changing the electrical current provided proximate to the MR fluid) of one MR clutch actuator causes one MR clutch actuator to overpower its opposing pair and move the output linkage assembly in one direction. In this manner, CSA system 400 may transmit flight control outputs provided through each output linkage assembly by changing the current provided to each MR clutch actuator.

Teachings of certain embodiments recognize that CSA system 400 may reduce costly maintenance operations and environmental impact by eliminating traditional hydraulic actuators. Teachings of certain embodiments recognize that CSA system 400 may replace heavier flight control actuation systems, and the weight of CSA system 400 may be optimized to more closely match operational loads using load sharing and asymmetrical design strategies. For example, the weight of CSA system 400 may be optimized using load sharing because the loads of the gearboxes may be shared between the three outputs. In addition, asymmetrical design strategies may be used because the clockwise and counterclockwise clutches may be designed with different torque requirements.

Furthermore, teachings of certain embodiments recognize that CSA system 400 may satisfy reliability standards by providing redundant components (e.g., multiple rotary units, wherein each rotary unit represents a gearbox and electric motor pair; multiple component redundancy within each MR clutch actuator, etc.) and by using MR clutch actuators that have relatively few components, relatively few moving parts, and transfer torque through fluid rather than solid contact surfaces. In addition, teachings of certain embodiments recognize that CSA system 400 may provide higher dynamic response than hydraulic and electromechanical actuators through inertia decoupling by the MR clutch actuators and fast response time. This high dynamic response may be beneficial for futuristic primary flight control actuators that require high frequency operations.

Figure 5:
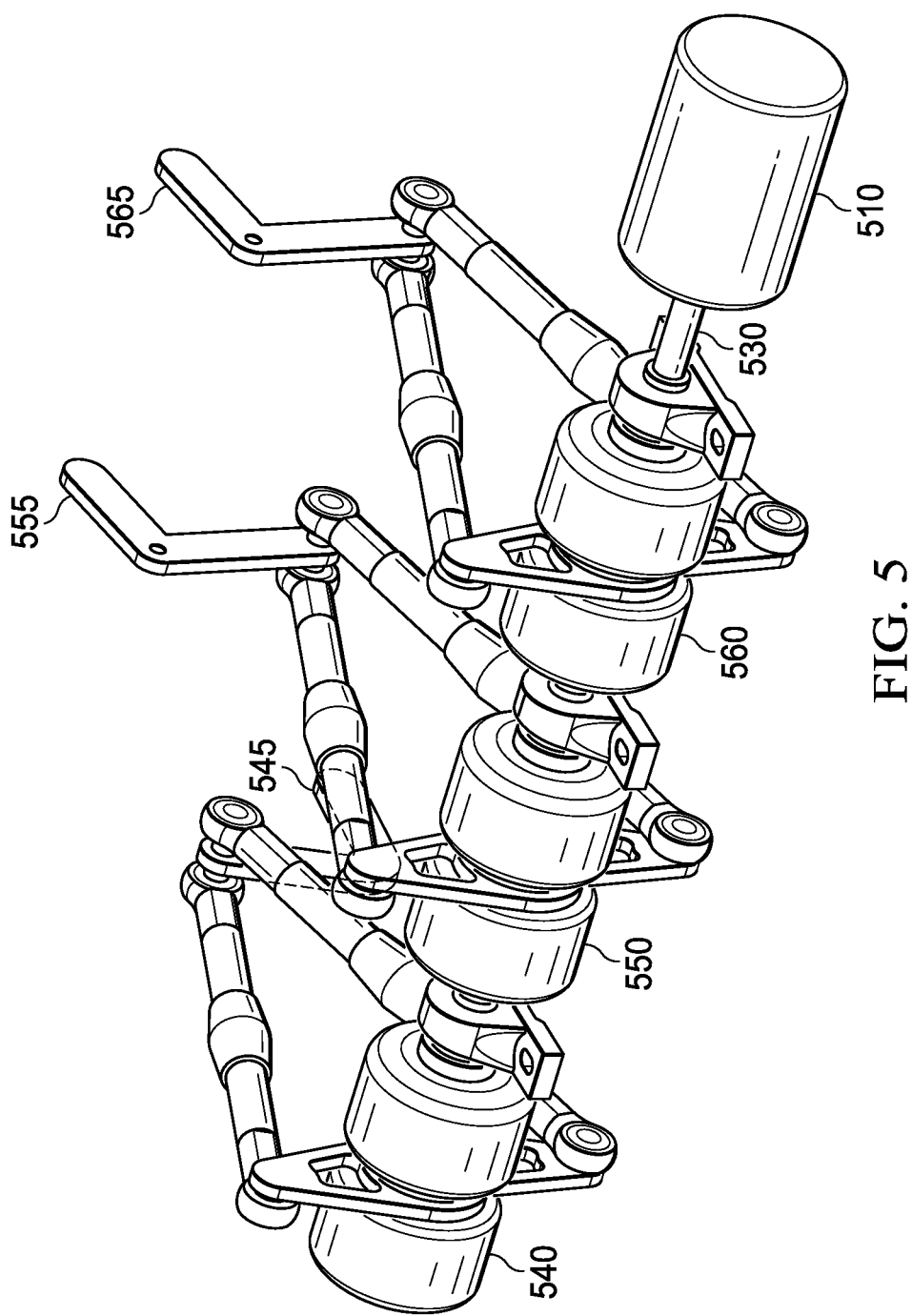
FIG. 5 shows another alternative embodiment of the CSA system of FIGS. 4A-4C.

Although the example CSA system 400 of FIGS. 4A-4C includes counter-rotating shafts, teachings of certain embodiments recognize the capability to provide bidirectional control without multiple shafts. For example FIG. 5 shows a CSA system 500 according to one alternative embodiment. CSA system 500 features a motor 510; a shaft 530; three MR fluid clutch actuators 540, 550, and 560; and three output linkage assemblies 545, 555, and 565. In this example embodiment, there is a single rotating shaft. Every degree of freedom of the embodiment may be controlled by two MR clutches: one controlling the clockwise (forward) movement and another one controlling the counter clockwise (backward) movement. In this example, the lever arm of the forward clutch is attached on top of the clutch, and the lever arm of the backward clutch is attached on the bottom of the clutch.

Although the examples of FIGS. 4A-4D and FIG. 5 describe the use of MR fluid clutches in a CSA system, teachings of certain embodiments recognize that other clutches may be used in slipping. For example, CSA systems may incorporate magnetic particle clutches, electrorheological clutches, and electromagnetic clutches in place of or in addition to MR fluid clutches.

Figure 6A:
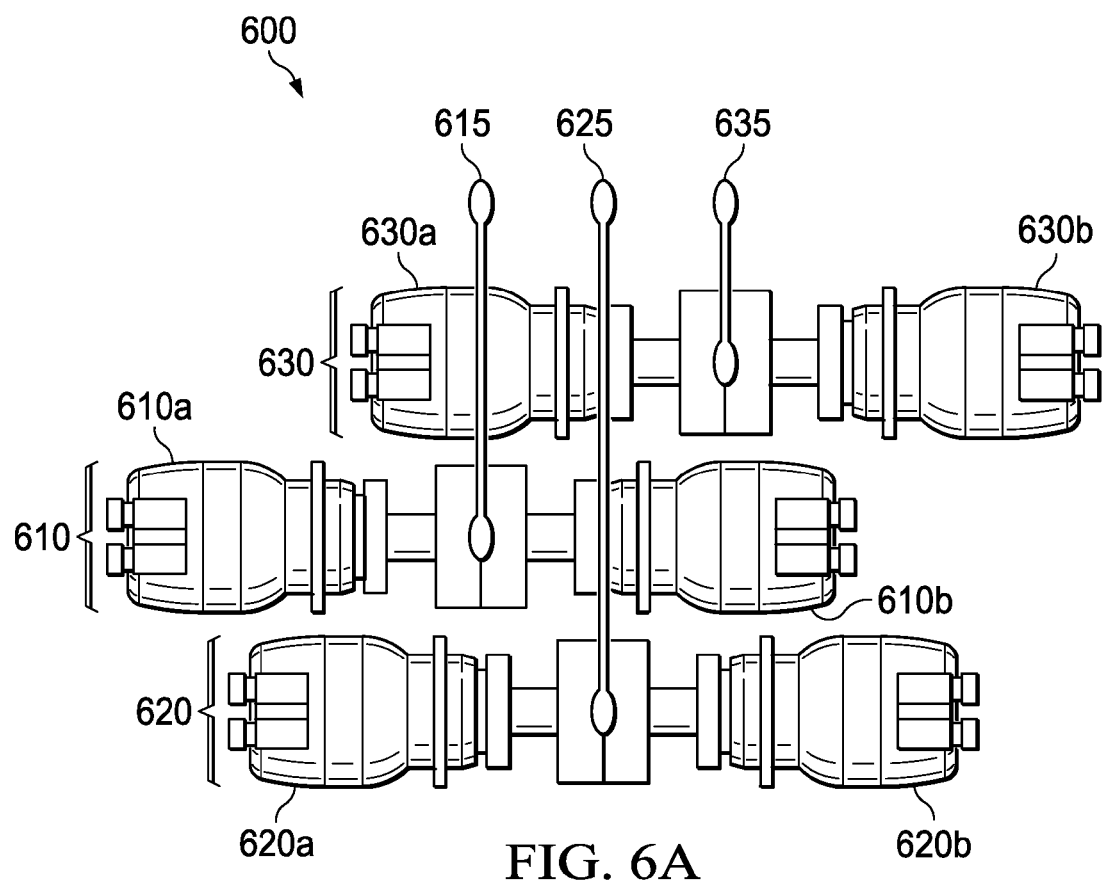
FIG. 6A shows a schematic top view of a clutch-redundant rotary motor (CRRM) system that incorporates an MR device such as the MR fluid clutch actuator of FIGS. 3A-3C.
Figure 6B:
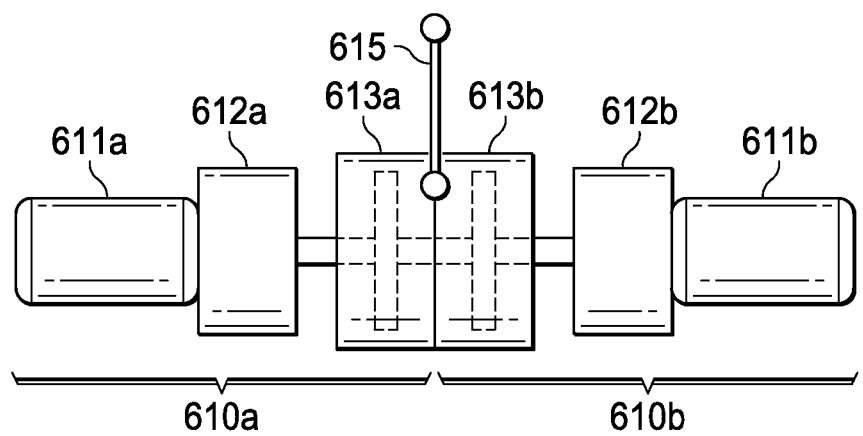
FIG. 6B shows a schematic view of a rotary unit pair of the CRRM system of FIG. 6A.
Figure 6C:
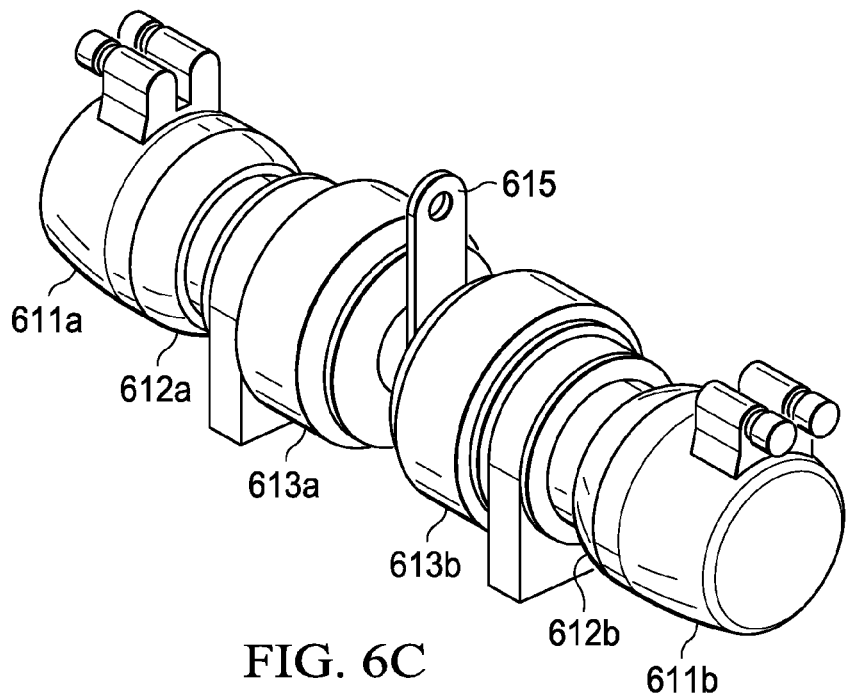
FIG. 6C shows a perspective view of a rotary unit pair of the CRRM system of FIG. 6A.

In addition, teachings of certain embodiments recognize to use clutches such as MR fluid clutches as a jam-release mechanism. For example, FIGS. 6A, 6B, and 6C shows a clutch-redundant rotary motor (CRRM) system 600 according to one example embodiment. FIG. 6A shows a schematic view of CRRM system 600, FIG. 6B shows a schematic view of a rotary unit pair of CRRM system 600, and FIG. 6C shows a perspective view of a rotary unit pair of CRRM system 600.

In the example of FIG. 6A, CRRM system 600 features three rotary unit pairs 610, 620, and 630 providing a mechanical output through linkages 615, 625, and 635, respectively. In this example embodiment, rotary unit pair 610 features rotary units 610a and 610b, rotary unit pair 620 features rotary units 620a and 620b, and rotary unit pair 630 features rotary units 630a and 630b.

Example rotary unit pair 610 is shown in FIGS. 6B and 6C. In this example embodiment, rotary unit pair 610 features rotary units 610a and 610b. Example rotary unit 610a features a motor 611a, a gearbox 612a, and a clutch device 613a, and example rotary unit 610b features a motor 611b, a gearbox 612b, and a clutch device 613b. One example of a clutch device may include MR clutch actuator 300. For example, in one embodiment, clutch devices 613a and 613b may, in combination, represent an MR clutch actuator 300 with separate magnetic field circuits, such as described with regard to FIGS. 3F and 3G.

In operation, according to one example embodiment, motors 611a and/or 611b may provide mechanical energy to change the position of linkage 615. If, in one example scenario, motor 611a jams or otherwise fails to work properly, clutch 613a may disengage motor 611a and allow motor 611b to drive movement of linkage 615. In one example embodiment, clutch 613a is disengaged by changing the magnetic field provided to the MR fluid in clutch 613a to create a decrease in viscosity. After failure, the clutch may also be used as a semi-active damper.

In the example of FIG. 6A, two motors are provided for each rotary unit pair, thus providing each rotary unit pair with a redundant motor. Thus, for the example of FIG. 6A, six motors are used to provide redundancy to a three-output system. Teachings of certain embodiments recognize, however, to provide redundancy to a three-output system without using six different motors.

Figure 7:
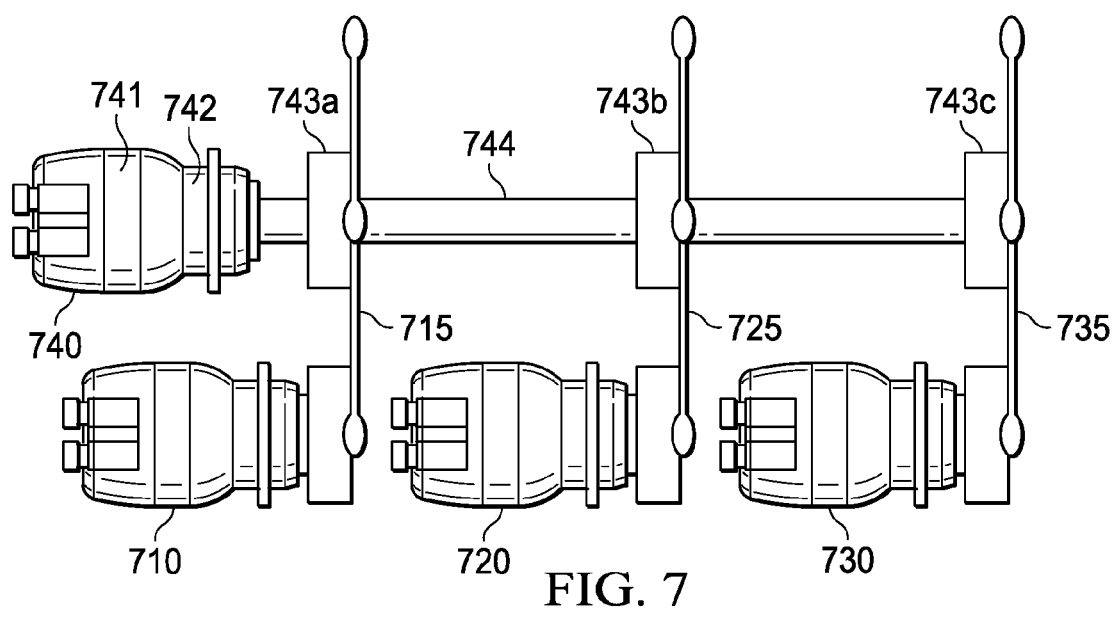
FIG. 7 shows an alternative embodiment of the CRRM system of FIGS. 6A-6C.

For example, FIG. 7 shows a CRRM system 700 with only four motors. In the example of FIG. 7, CRRM system 700 features primary rotary units 710, 720, and 730; a shared rotary unit 740; and linkages 715, 725, and 735. Each primary rotary unit 710, 720, and 730 may include a single motor, gearbox, and clutch; in this manner, each primary rotary unit may resemble one of the rotary units of FIGS. 6A-6C. Shared rotary unit 740, however, features a single motor 741, a single gearbox 742, and three clutches 743a, 743b, and 743c. Linkage 715 couples the clutch of rotary unit 710 to clutch 743a, linkage 725 couples the clutch of rotary unit 720 to clutch 743b, and linkage 735 couples the clutch of rotary unit 730 to clutch 743c. A shared shaft 744 couples clutches 743a, 743b, and 743c to motor 741 and gearbox 742.

In operation, according to one example embodiment, rotary unit 710 may drive linkage 715, rotary unit 720 may drive linkage 725, and rotary unit 730 may drive linkage 735. Rotary unit 740 may remain disengaged so long as rotary units 710, 720, and 730 are operating properly. If, however, a failure occurs (e.g., the clutch of rotary unit 710 fails or the motor of rotary unit 710 fails), the clutch of rotary unit 710 may be disengaged, and clutch 743a may engage shared rotary unit 740 so as to allow shared rotary unit 740 to drive linkage 715. If the clutch of rotary unit 710 is an MR device, for example, the clutch be disengaged by changing the magnetic field delivered to the clutch such that the MR fluid transmits less mechanical energy from the driving member to the driven member of the disengaged clutch. Likewise, if the clutch 743a is an MR device, the clutch be engaged by changing the magnetic field delivered to the engaged shared clutch such that the MR fluid transmits more mechanical energy from the driving member to the driven member of the engaged shared clutch.

In this manner, shared rotary unit 740 may be sufficient to provide redundancy to all three primary rotary units 710, 720, and 730 in the event that one primary rotary unit fails. Shared rotary unit 740 would not, however, be able to provide sufficient redundancy in the event that two primary rotary units fail at the same time. Thus, teachings of certain embodiments recognize that CRRM system 700 may be best suited for environments in which (1) the likelihood of two motors failing is low or (2) the benefit of removing two motors (e.g., weight savings) is more important than the risk of two motors failing.

Although a variety of clutches may be used in a CRRM system such as CRRM systems 600 and 700, teachings of certain embodiments recognize that electromechanical and MR fluid clutches may be particularly well-suited because they are lightweight and have a low response time. Moreover, MR clutches transfer torque through fluid and therefore are potentially jamless and more reliable. Accordingly, MR fluid clutches may be particularly well-suited for applications such as CRRM system 700 that require a higher level of reliability.

Returning to the example of FIGS. 3A-3C, MR fluid devices such as MR fluid clutch actuator 300 may be used in systems that control various flight control devices, such as the swashplate of a flight control system. Teachings of certain embodiments recognize that MR fluid devices may be used in a variety of other devices.

Figure 8A:
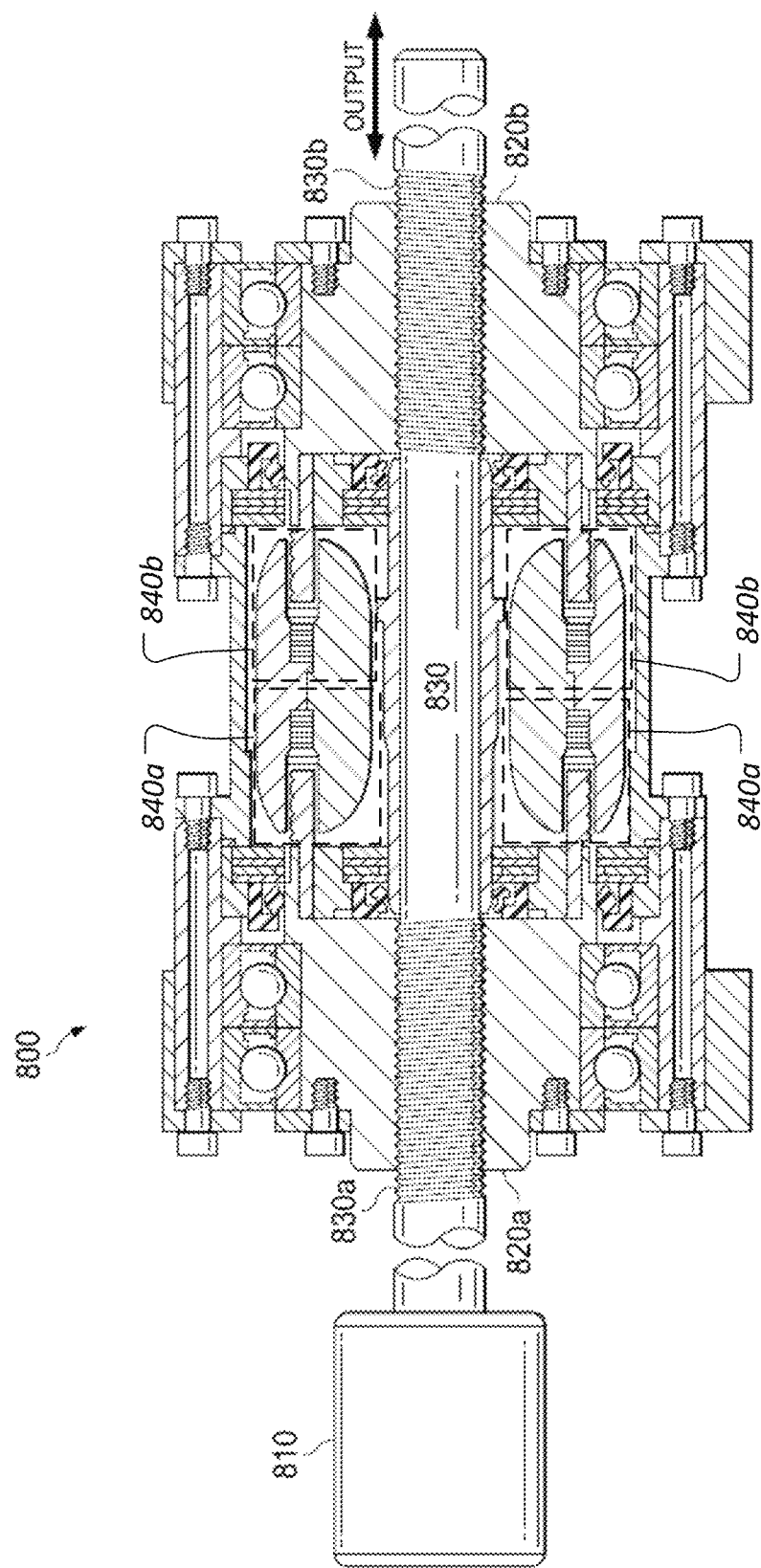
FIG. 8A shows a schematic view of an MR tail rotor actuation system (MTRAS) that incorporates an MR device such as the MR fluid clutch actuator of FIGS. 3A-3C.
Figure 8B:
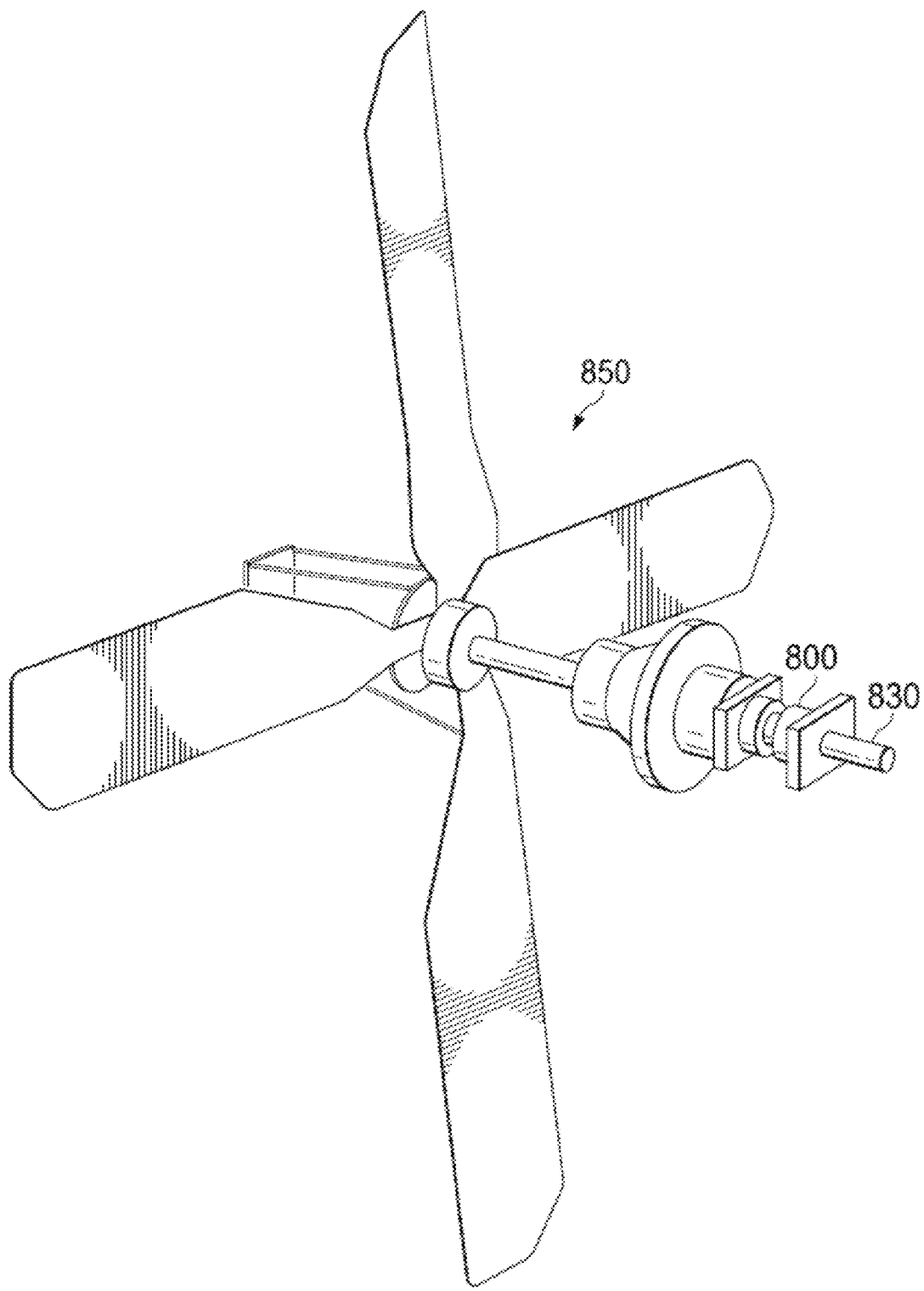
FIGS. 8B shows the MTRAS of FIG. 8A incorporated into a tail rotor system.

As one example, MR fluid devices may be incorporated into a tail rotor system as well as a main rotor system. For example, FIGS. 8A and 8B show an MR tail rotor actuation system (MTRAS) 800 according to one example embodiment. FIG. 8A shows a schematic view of the example MTRAS 800, and FIG. 8B shows the MTRAS 800 of FIG. 8A incorporated into a tail rotor system.

In the example of FIG. 8A, MTRAS 800 features a coupling 810, roller nuts 820a and 820b, a shaft 830 having a right-handed thread 830a and a left-handed thread 830b, and MR devices 840*a* and 840*b*. In the example of FIG. 8A, MR fluid devices 840*a* and 840*b* may represent drum brakes that may incorporate functionality from the example MR fluid clutch actuator of FIGS. 3A-3C. In the example of FIG. 8B, shaft 830 is coupled to tail-rotor system 850 such that linear movement of shaft 830 changes the pitch of the tail-rotor blades, in some embodiments, in a manner substantially similar to the manner in which the pitch of blades 120 are changed as described above.

In the example of FIG. 8A, motor attached to coupling 810 may rotate shaft 830 at a substantially constant speed. In the example embodiment of FIG. 8A, shaft 830 is mechanically connected to the tail-rotor control tube through coupling 810. Teachings of certain embodiments recognize that other power sources, such as an electric motor, may be used.

The example of FIG. 8A features two roller-screw mechanisms equipped with a roller nut (e.g., roller nut 820*a* or 820*b*) and a MR drum brake (e.g., MR devices 840*a* or 840*b*) that may be used to control the back and forth motion of shaft 830 (and thus the pitch of the tail-rotor blades).

During normal operation, according to one example embodiment, roller nuts 820*a* and 820*b* may be free to slip in rotation relatively to the MTRAS casing when no current is applied to MR devices 840*a* and 840*b*. The linear position of shaft 830 may remain relatively stable as long as roller nuts 820*a* and 820*b* slip at approximately the same rate.

MTRAS 800 may change the linear position of shaft 830, however, by causing one roller nut to slip faster (or slower) than the other. For example, by applying a current in the coil of one MR device, a magnetic field may be induced in the MR fluid of that MR device, which increases the MR fluid's apparent viscosity and causes the MR fluid to apply a braking torque to the corresponding roller nut. Applying a braking torque to one roller nut may cause shaft 830 to translate linearly with the thread direction.

Thus, in the example of FIG. 8A, MTRAS 800 may control linear output by providing a common input/output shaft 830 and braking two rotating nuts 820*a* and 820*b* using MR devices 840*a* and 840*b*. Teachings of certain embodiments recognize, however, that linear output may be controlled by providing a common input/output nut assembly and two threaded shafts that are braked using MR devices 840*a* and 840*b*. In this example embodiment, MR devices 840*a* and 840*b* may selectively brake corresponding threaded shafts to cause the common nut assembly to translate linearly.

Teachings of certain embodiments recognize that MTRAS 800 may reduce costly maintenance operations and environmental impact by reducing the number of parts and eliminating traditional tail rotor control devices. MTRAS 800 may also reduce weight by eliminating multiple linkages between the main cabin and the tail rotor system. MTRAS 800 may also improve tail rotor performance over other actuation systems because MTRAS 800 may be directly aligned with coupling 810 (e.g., the control tube of the tail-rotor system).

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising an engine and a drive shaft coupled to the engine;
   a rotor system coupled to the power train, the rotor system comprising at least one rotor blade;
   a pilot input device;
   a first flight control system comprising a first power source and a first clutch configured to receive mechanical energy from the first power source, the first flight control system configured to receive an input from the pilot input device and transmit a mechanical output to the rotor system based on the received input;
   a second flight control system comprising a second power source and a second clutch configured to receive mechanical energy from the second power source, the second flight control system configured to receive an input from the pilot input device and transmit a mechanical output to the rotor system based on the received input;
   a shared clutch system comprising:
      a shared shaft configured to receive mechanical energy from a shared power source;
      a first shared clutch corresponding to the first clutch and configured to receive mechanical energy from the shared shaft; and
      a second shared clutch corresponding to the second clutch and configured to receive mechanical energy from the shared shaft;
   a first linkage providing mechanical communication between an output of the first clutch, an output of the first shared clutch, and a first output device in mechanical communication with the rotor system; and
   a second linkage providing mechanical communication between an output of the second clutch, an output of the second shared clutch, and a second output device in mechanical communication with the rotor system.

2. The rotorcraft of claim 1, wherein at least one of the first linkage or the second linkage comprises a plurality of linkages.

3. The rotorcraft of claim 1, further comprising a control system configured to:
   identify a failure associated with the first clutch or the second clutch;
   disengage the clutch associated with the failure; and
   engage the shared clutch corresponding to the failed clutch.

4. The rotorcraft of claim 3, wherein a failure associated with the first clutch comprises a failure of the first clutch or a failure of the first power source.

5. The rotorcraft of claim 3, wherein disengaging the clutch associated with the failure and engaging the corresponding shared clutch causes the engaged shared clutch to provide mechanical outputs to the rotor system in place of the disengaged clutch.

6. The rotorcraft of claim 1, wherein the first flight control system transmits a mechanical output to the rotor system based on the received input by varying an amount of mechanical energy transmitted from the first power source, through the first clutch, and to the rotor system.

7. The rotorcraft of claim 1, wherein the first clutch is a controlled-slippage actuator comprising a driving member configured to receive mechanical energy from the first power source and a driven member configured to receive mechanical energy from the driving member, the first clutch operable to receive an input from the pilot input device and transmit a mechanical output to the rotor system based on the received input by changing the amount of mechanical energy transmitted from the driving member to the driven member.

8. The rotorcraft of claim 1, wherein:
the first clutch comprises:
 a driving member configured to receive mechanical energy from the first power source;
 a driven member;
 a magnetorheological (MR) fluid disposed between the driving member and the driven member and configured to transmit a variable amount of mechanical energy from the driving member to the driven member;
 an output member coupled between the driven member and the rotor system; and
 a magnetic circuit configured to deliver a magnetic field towards the MR fluid, the magnetic circuit configured to vary the strength of the magnetic field in response to inputs received from the pilot input device; and
the second clutch comprises:
 a driving member configured to receive mechanical energy from the first power source;
 a driven member;
 an MR fluid disposed between the driving member and the driven member and configured to transmit a variable amount of mechanical energy from the driving member to the driven member;
 an output member coupled between the driven member and the rotor system; and
 a magnetic circuit configured to deliver a magnetic field towards the MR fluid, the magnetic circuit configured to vary the strength of the magnetic field in response to inputs received from the pilot input device.

9. The rotorcraft of claim 8, further comprising a control system configured to:
 identify a failure associated with the first clutch or the second clutch;
 disengage the clutch associated with the failure by changing the magnetic field delivered to the disengaged clutch such that the MR fluid transmits less mechanical energy from the driving member to the driven member of the disengaged clutch; and
 engage the shared clutch corresponding to the failed clutch by changing the magnetic field delivered to the engaged shared clutch such that the MR fluid transmits more mechanical energy from the driving member to the driven member of the engaged shared clutch.

10. The rotorcraft of claim 1, further comprising:
 a third flight control system comprising a third power source and a third clutch configured to receive mechanical energy from the third power source, the third flight control system configured to receive an input from the pilot input device and transmit a mechanical output to the rotor system based on the received input;
 a third shared clutch corresponding to the third clutch and configured to receive mechanical energy from the shared shaft; and
 a third linkage providing mechanical communication between an output of the third clutch, an output of the third shared clutch, and a third output device in mechanical communication with the rotor system.

11. The rotorcraft of claim 10, wherein the first output device transmits collective rotor commands and the second and third output devices transmit cyclic rotor commands.

12. The rotorcraft of claim 1, wherein the first power source and the second power source are the same power source.

13. The rotorcraft of claim 1, wherein the rotor system comprises a main rotor system comprising at least one main rotor blade.

14. The rotorcraft of claim 13, wherein the first and second flight control systems are configured to transmit mechanical outputs to a swashplate of the main rotor system based on the received inputs.

15. The rotorcraft of claim 1, wherein the first power source comprises an electric motor.

16. The rotorcraft of claim 1, wherein the first power source comprises a rotorcraft gearbox in mechanical communication with the engine of the power train.

17. A redundant control system, comprising:
 a first control system comprising a first power source and a first clutch configured to receive mechanical energy from the first power source, the first control system configured to receive an input from an input device and transmit a mechanical output based on the received input;
 a second control system comprising a second power source and a second clutch configured to receive mechanical energy from the second power source, the second control system configured to receive an input from the input device and transmit a mechanical output based on the received input;
 a shared clutch system comprising:
  a shared shaft configured to receive mechanical energy from a shared power source;
  a first shared clutch corresponding to the first clutch and configured to receive mechanical energy from the shared shaft; and
  a second shared clutch corresponding to the second clutch and configured to receive mechanical energy from the shared shaft;
 a first linkage providing mechanical communication between an output of the first clutch, an output of the first shared clutch, and a first output device in mechanical communication with the rotor system; and
 a second linkage providing mechanical communication between an output of the second clutch, an output of the second shared clutch, and a second output device in mechanical communication with the rotor system.

18. The redundant control system of claim 17, wherein:
the first clutch comprises:
 a driving member configured to receive mechanical energy from the first power source;
 a driven member;
 a magnetorheological (MR) fluid disposed between the driving member and the driven member and configured to transmit a variable amount of mechanical energy from the driving member to the driven member;

an output member coupled between the driven member and the rotor system; and a magnetic circuit configured to deliver a magnetic field towards the MR fluid, the magnetic circuit configured to vary the strength of the magnetic field in response to inputs received from the pilot input device; and the second clutch comprises:

a driving member configured to receive mechanical energy from the first power source;

a driven member;

an MR fluid disposed between the driving member and the driven member and configured to transmit a variable amount of mechanical energy from the driving member to the driven member;

an output member coupled between the driven member and the rotor system; and a magnetic circuit configured to deliver a magnetic field towards the MR fluid, the magnetic circuit configured to vary the strength of the magnetic field in response to inputs received from the pilot input device.

19. A method of controlling a rotor system of a rotorcraft, comprising:

receiving a first input and a second input from one or more pilot input devices;

providing mechanical energy to a first clutch such that the first clutch transmits a mechanical output based on the received first input;

providing mechanical energy to a second clutch such that the second clutch transmits a mechanical output based on the received second input;

providing mechanical energy to a shared clutch system, the shared clutch system comprising:

a shared shaft configured to receive mechanical energy from a shared power source;

a first shared clutch corresponding to the first clutch and configured to receive mechanical energy from the shared shaft, the first shared clutch having an output mechanically linked with an output of the first clutch; and a second shared clutch corresponding to the second clutch and configured to receive mechanical energy from the shared shaft, the second shared clutch having an output mechanically linked with an output of the second clutch;

identifying a failure associated with the first clutch or the second clutch;

disengaging the clutch associated with the failure; and engaging the shared clutch corresponding to the failed clutch.

20. The method of claim 19, wherein disengaging the clutch associated with the failure and engaging the corresponding shared clutch causes the engaged shared clutch to provide mechanical outputs to the rotor system in place of the disengaged clutch.

* * * * *